US006508900B1

(12) United States Patent
Kendall et al.

(10) Patent No.: US 6,508,900 B1
(45) Date of Patent: Jan. 21, 2003

(54) INTEGRATED PRESSURE SENSITIVE ADHESIVE LABEL APPLICATION SURFACE AND PULL CARD HOLDER

(75) Inventors: Michael David Kendall, Grand Blanc, MI (US); Rebecca A. Kaspryk, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 97 days.

(21) Appl. No.: 09/655,925

(22) Filed: Sep. 6, 2000

(51) Int. Cl.[7] .......................... B32R 31/00; B42D 15/00

(52) U.S. Cl. ................. 156/226; 156/227; 156/DIG. 2; 40/594; 428/121; 283/62; 281/5

(58) Field of Search ................................ 156/226, 227, 156/441.5, 442.1, DIG. 2; 428/121, 40.1; 40/594; 281/2, 5; 283/81, 62

(56) References Cited

U.S. PATENT DOCUMENTS

| | | | | | |
|---|---|---|---|---|---|
| 4,551,373 | A | * | 11/1985 | Conlon | |
| 4,566,590 | A | | 1/1986 | Manning et al. | |
| 4,708,368 | A | * | 11/1987 | Instance | |
| 4,850,613 | A | * | 7/1989 | Instance | |
| 5,101,973 | A | * | 4/1992 | Martinez | 206/308.1 |
| 5,417,790 | A | | 5/1995 | Petrou | |
| 5,628,858 | A | | 5/1997 | Petrou | |
| 5,776,571 | A | * | 7/1998 | Michlin et al. | |
| 6,129,387 | A | * | 10/2000 | Chess | |

OTHER PUBLICATIONS

Buckhorn Label Holder Information Sheet of Buckhorn, Inc. of Milford, OH 45150. Dated: Apr. 25, 1996.

Orbis Cardholder Information Sheet of Menasha Corp. of Oconomowoc, WI 53066. Dated: Mar. 27, 1998.

* cited by examiner

*Primary Examiner*—Jeff H. Aftergut
*Assistant Examiner*—John T. Haran
(74) *Attorney, Agent, or Firm*—Vincent A. Cichosz

(57) ABSTRACT

An integrated pressure sensitive adhesive label application surface and pull card holder in the form of a placard component and an integral pocket component. The placard component includes a placard wall having a first side and an opposite second side, wherein a pressure sensitive adhesive coating is present on the first side. A rear wall of the pocket component is integrally connected with the placard wall, wherein a fold-over is provided at an imaginary demarcation therebetween. A front wall is superposed the rear wall, and secured to the rear wall along the mutual peripheries, except adjacent the fold-over. In one form of the present invention, the placard wall is provided with a preferably white color, the pocket component is clear, and the second side of the placard wall has a release coating. In another form of the present invention, the placard wall and pocket component are clear, and a conventional label system (ie., a "Kennedy label") is applied to the second side of the placard wall (there being no release coating on the second side).

13 Claims, 3 Drawing Sheets

INTEGRATED PRESSURE SENSITIVE ADHESIVE LABEL APPLICATION SURFACE AND PULL CARD HOLDER

TECHNICAL FIELD

The present invention relates to containers, labels adhesively applied thereto, and pull cards removably associated therewith. More particularly, the present invention relates to an integrated pressure sensitive label application surface and pull card holder for being adhesively affixed to a container so as to provide a centralized location for both a pressure sensitive label and a pull card.

BACKGROUND OF THE INVENTION

Containers are used commercially to transport small pieces from one location to another. Particularly well suited for this type of transport are "returnable" containers which are reused repeatedly. Returnable containers are usually plastic, box-shaped containers configured for compact stacking. A family of commonly used returnable containers, and example of which is shown at 10 of FIG. 1, is manufactured by Buckhorn, Inc. of Milford, Ohio 45150, and are often referred to as a "Buckhorn". Pressure sensitive adhesive labels are applied to the returnable container, and once delivered and emptied at the destination, the returnable container is returned to the sender so that it can be used again.

In order to facilitate the placement of pressure sensitive adhesive labels on the exterior sidewall of a returnable container, it has become a common practice to apply to a conspicuous sidewall location thereof a label system characterized by a pliable plastic placard sheet, composed preferably of polypropylene, having an inner side and an opposite outer side, a pressure sensitive adhesive being applied to the inner side, and a release coating, preferably silicone, being applied to the outer side. Such a label system 20 (shown at FIG. 1) is described in U.S. Pat. No. 5,628,858 to Petrou, dated May 13, 1997, and U.S. Pat. No. 5,417,790 also to Petrou, dated May 23, 1995, both patents being hereby incorporated herein by reference. A label system currently produced under these patents, known ubiquitously as a "Kennedy label" are manufactured by The Kennedy Group of Willoughby, Ohio 44094, in the form of a white colored soft plastic sheet placard having indicia thereon indicating intended use, specifically "APPLY SHIPPING LABELS ON THIS AREA ONLY." The theory of operation of the label system is that it provides a conspicuous label placement location and allows for easy re-labeling in that the adhesive of the placard sheet of the label system has a bonding strength that exceeds the adhesive bonding strength of the pressure sensitive adhesive of the labels being applied to the placard sheet. In operation, a release paper backing is peeled off the adhesive coating, and the adhesive coating of the placard sheet is applied to a selected exterior sidewall surface 12 of a container 10. Thereafter, shipping or other pressure sensitive adhesive labels 30 are applied to the silicone release coating side of the placard sheet, and then later peeled off when the use of the label has concluded. The placard sheet remains on the container for use with a next label.

When containers reach their destination via the direction indicated on the label, it is frequently the case that the container must then be further identified and/or be provided with instructions so that the contents thereof are properly used. Conventionally, this is accomplished by use of a pull card 40 upon which is placed written information and/or instructions. Accordingly, returnable containers include a pull card holder 50 attached to an exterior surface of a sidewall 14 which removably holds a pull card; a pull card usually being in the form of a stiff paper or card-stock article. The operation and location of the pull card holder is entirely different from the label system referred to hereinabove.

Because the label location and the pull card location are different and mutually separated, it not only involves added cost to provide separate facilities for each, but confusion can arise (as for example improper routing or overlooked instruction) if someone does not timely notice the information present at both of the two separate locations.

Accordingly, it remains a need in the art to somehow combine a label location and a pull card location to thereby save cost and avoid potential confusion.

SUMMARY OF THE INVENTION

The present invention is an integrated pressure sensitive adhesive label application surface and pull card holder in the form of a placard component and an integral pocket component. The placard component includes a placard wall having a first side and an opposite second side, wherein a pressure sensitive adhesive coating is present on the first side. A peelable release paper protects the adhesive coating until it is adhered to a sidewall of a container. A rear wall of the pocket component is integrally connected with the placard wall, wherein a fold-over is provided at an imaginary demarcation therebetween. A front wall is superposed the rear wall, and is secured to the rear wall along the mutual peripheries, except adjacent the fold-over. In this regard, a soft plastic sheet, preferably of vinyl, is provided with the fold over, so that one portion of the sheet provides the placard wall of the placard component, and the remainder thereof provides the rear wall of the pocket component. Because of the fold-over, the rear wall of the pocket component is naturally positioned superposed the second side of the placard wall. In one form of the present invention, the placard wall is provided with a preferably white color, the pocket component is clear, and the second side of the placard wall has a release coating, as for example a silicone coating. In another form of the present invention, both the placard wall and the pocket component are clear, and a conventional label system (ie., a "Kennedy label") is applied to the second side of the placard wall (there being no silicone on the second side).

In operation, the release paper is peeled off from the adhesive coated side of the placard wall, and the adhesive is pressed onto a suitable sidewall location of a container. The plastic of the pocket component is clear, so a label applied to the placard component (ie., upon the second side of the placard wall, or upon a label system already applied thereto) is clearly visible through the pocket component. Upon reaching a destination, a pull card is easily inserted into the pocket component through the opening adjacent the fold-over so as to be held between the front and rear walls. Again, the clarity of the front wall of the pocket component allows someone to easily read the pull card.

Upon concluding the use of the returnable container, the pull card is removed. Easy re-labeling is achieved because the adhesive of the first side of the placard wall has a bonding strength that exceeds the adhesive bonding strength of the pressure sensitive adhesive of the labels being applied to the first side of the placard wall. Accordingly, the old label is peeled off (with the placard wall remaining attached to the container) and a new label, if necessary, is placed onto the second side of the placard wall. Upon arrival, the label is peeled off and a new one is placed onto the placard component consistent with the new use of the container.

Accordingly, it is an object of the present invention to provide an integrated pressure sensitive label application surface and pull card holder.

This, and additional objects, advantages and features of the present invention will become clear from the following exemplification in the form of a preferred embodiment.

DESCRIPTION OF THE PREFERRED EMBODIMENT

Figure 1:
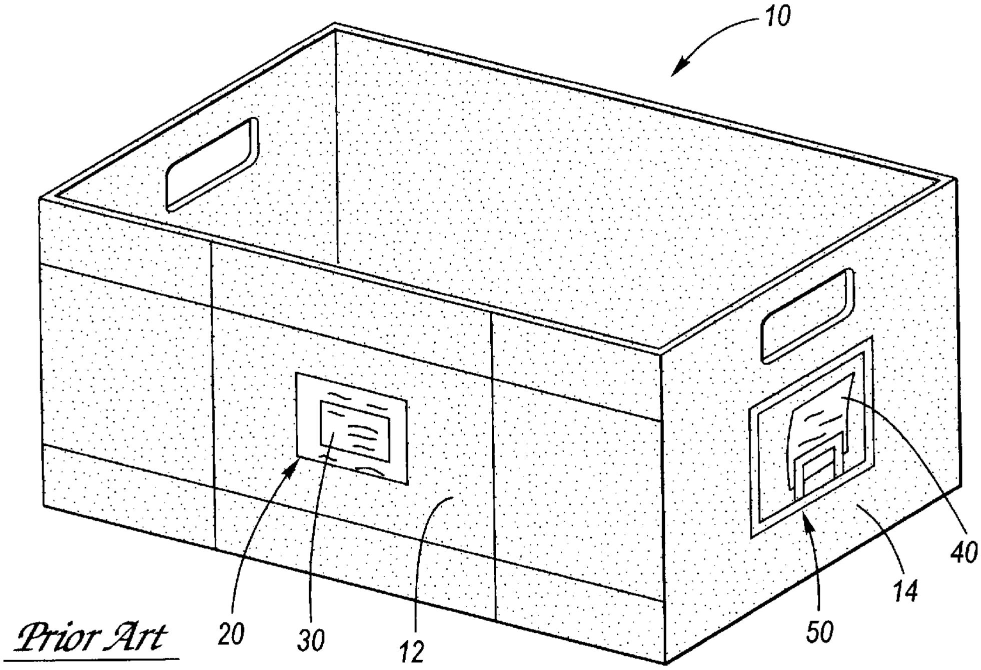
FIG. 1 is a perspective view of a prior art returnable container and a label system and a pull card holder therefor.

Referring now to FIGS. 2 through 8B, a preferred example of an integrated pressure sensitive adhesive label application surface and pull card holder 100 will be detailed, wherein the integrated pressure sensitive adhesive label application surface and pull card holder is composed of a placard component 102 and an integrally connected pocket component 104, each of which being formed of a pliable plastic material, preferably vinyl.

The placard component 102 includes a placard wall 106 having a first side 106*a* and an opposite second side 106*b*, wherein a pressure sensitive adhesive coating 108 is applied to the first side. A peelable release paper 110 protects the adhesive coating, and it is peeled off to expose the adhesive when it is time to apply the adhesively coated first side to a sidewall 112 of a container 114 (see FIG. 7A), as for example a returnable container.

Figure 6:
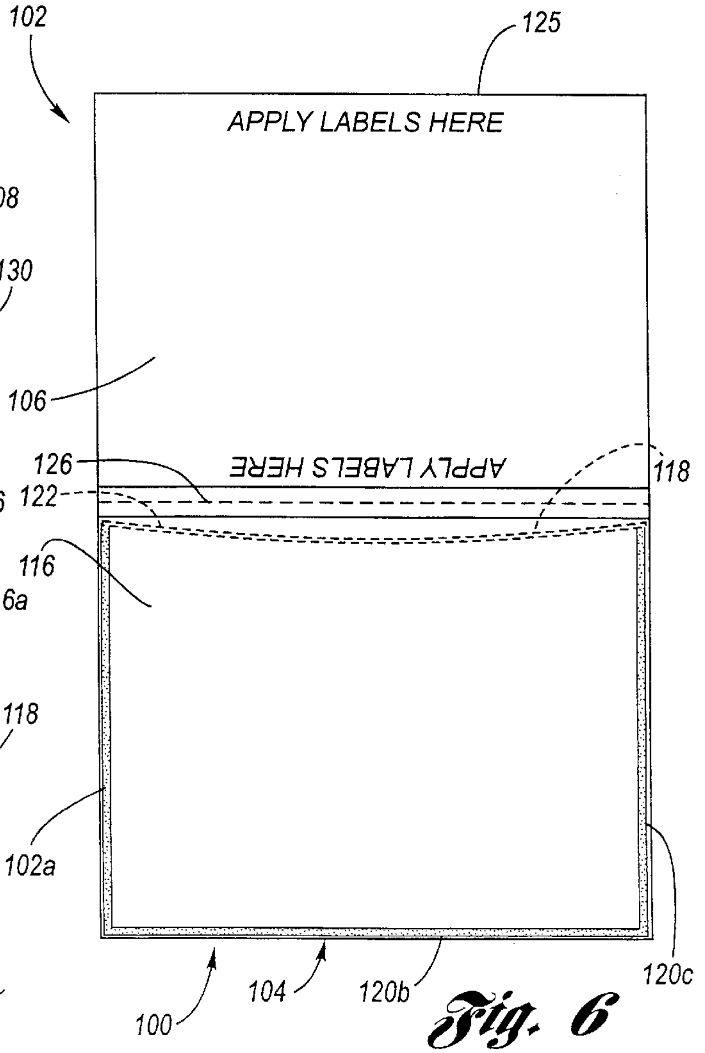
FIG. 6 is an assembled plan view of the integrated pressure sensitive adhesive label application surface and pull card holder according to the present invention.

The pocket component 104 is composed of a rear wall 116 having a first side 116*a* and an opposite second side 116*b*, and is further composed of a front wall 118 which is connected to the first side of the rear wall on three peripheral edges 120*a*, 120*b*, 120*c* so as to thereby form a mouth 122 (see FIG. 6). The rear wall 116 is integrally connected with the placard wall 106, wherein a fold-over 124 is provided at an imaginary demarcation 126 therebetween. The front wall 118 is superposed the rear wall 116, wherein the mouth 122 is located adjacent the fold-over 124 (and also adjacent the imaginary demarcation 126).

Figure 2:
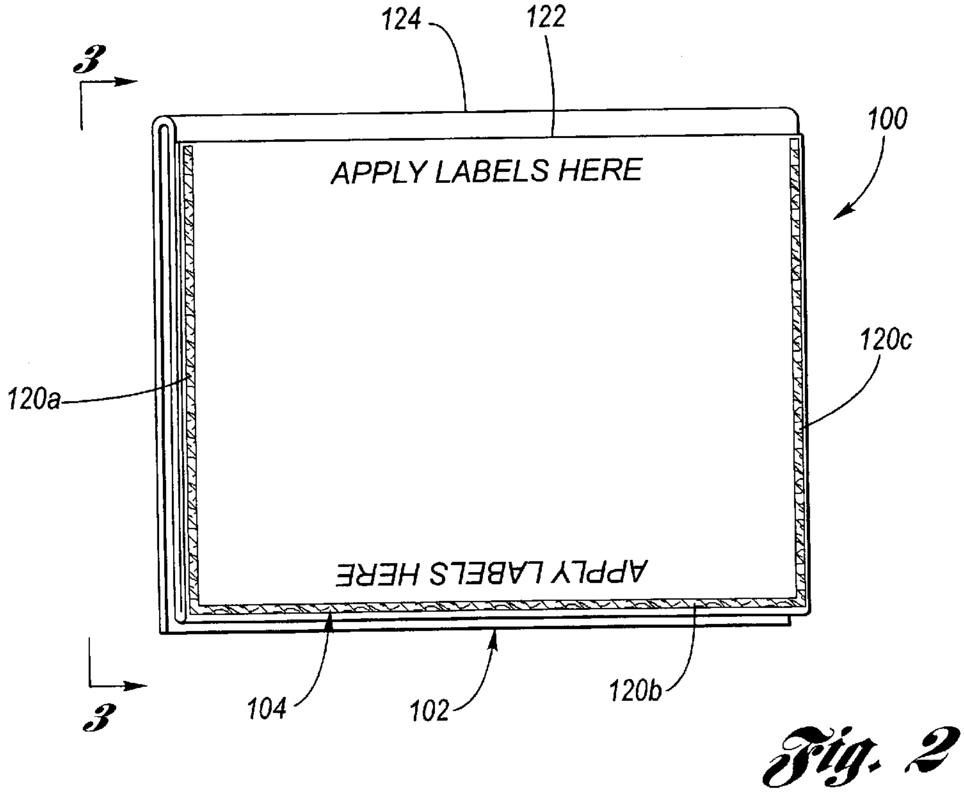
FIG. 2 is a perspective view of an integrated pressure sensitive adhesive label application surface and pull card holder according to the present invention.
Figure 3:
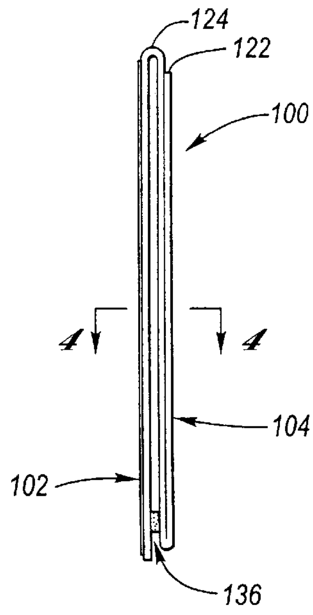
FIG. 3 is a side view, seen along line 3—3 of FIG. 2.
Figure 4:
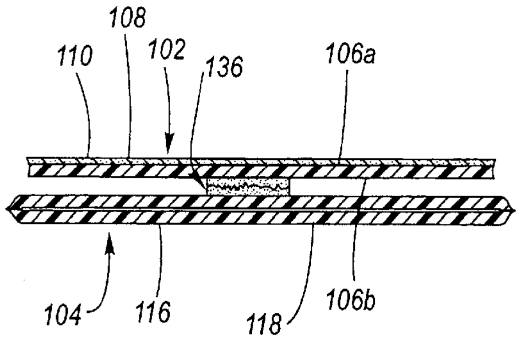
FIG. 4 is a sectional view seen along line 4—4 of FIG. 3.
Figure 5:
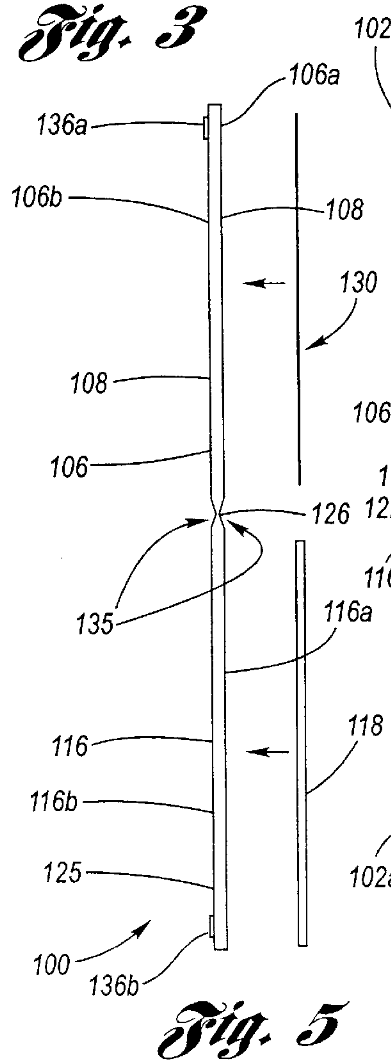
FIG. 5 is an exploded assembly side view of the integrated pressure sensitive adhesive label application surface and pull card holder according to the present invention.
Figure 7A:
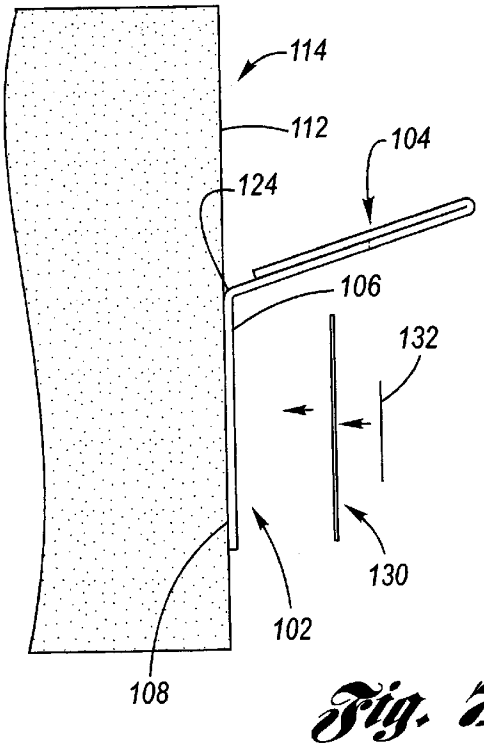
FIG. 7A is a side view of the integrated pressure sensitive adhesive label application surface and pull card holder according to the present invention, seen at an intermediate state of a first stage of operation.

In fabrication of the integrated pressure sensitive adhesive label application surface and pull card holder 100, it is preferred for a single sheet 125 of pliable plastic to form both the placard wall 106 and the rear wall 116. The preferred pliable plastic sheet 125 is an 0.016 of an inch thick double polished clear 2H clear vinyl sheet, as for example 7 inches by 10 inches in area. A reduced cross-section strip 135 is provided in the sheet 125 at the imaginary demarcation 126, as for example by a hot press operation. The front wall 118, for example 5 inches by 4.5 inches in area, is attached to the front side 116*a* of the rear wall 116 at the peripheral edges 102*a*, 120*b*120*c*, such as for example by a heat seal process. The reduced cross-section strip 135 provides enhanced flexibility of the fold over 124, which is provided by a heated folding process which, when cooled, results in the reduced cross-section strip 135 remembering the folding (as shown at FIG. 3). Because of the fold-over, the pocket component is provided with a naturally relaxed position which is superposed the second side of the placard component, as generally depicted at FIGS. 2 and 3; however, the pliability of the plastic allows for the pocket component 104 to be flexed at the fold-over relative to the placard component 102, as depicted at FIG. 7A.

A releasable fastener may optionally be used to selectively retain the pocket component closely adjacent and superposed the placard component. While a snap or two-sided adhesive tape for example may be used, a preferred releasable fastener is a two-component flexible hook and loop fastener system 136, as for example VELCRO (a trademark of Velcro, USA), may optionally hold the pocket component closely adjacent the placard wall. A first component 136*a* of the two-component flexible hook and loop fastener system 136 is attached to the second side 106*b* of the placard wall 106, and a second component 136*b* of the two-component flexible hook and loop fastener system is attached to the second side 116*b* of the rear wall 116.

In one form of the preferred embodiment of the integrated pressure sensitive adhesive label application surface and pull card holder 100, the placard wall 106 is preferably an opaque white color, the pocket component 104 is clear, and the second surface 106*b* of the placard wall 106 preferably has a release coating, as for example a silicone coating. In another form of the integrated pressure sensitive adhesive label application surface and pull card holder 100, both the placard wall 102 and the pocket component are clear, there is no release coating on the second side, and a conventional label system 130 (ie., a "Kennedy label") is applied to the second side 106*b* (see FIG. 7A).

Figure 7B:
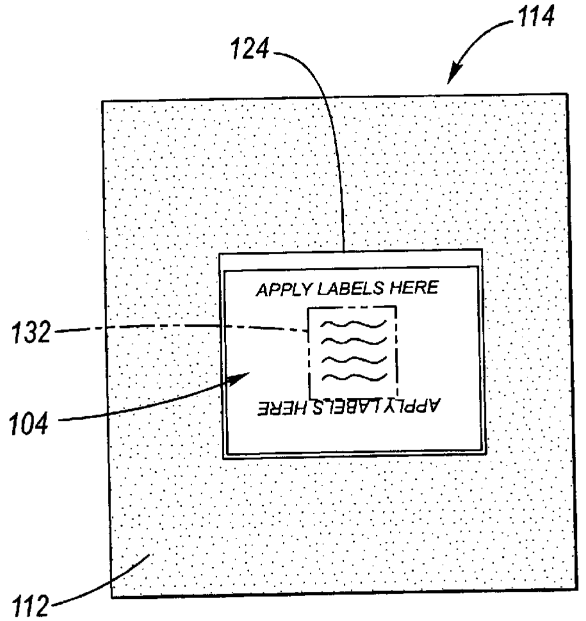
FIG. 7B is a plan view of the integrated pressure sensitive adhesive label application surface and pull card holder according to the present invention, seen at a final state of the first stage of operation

As shown at FIG. 7B, a pressure sensitive adhesive label 132, as for example a shipping label is applied to the placard component, either upon the second side of the placard wall or upon a label system already adhered thereto as indicated hereinabove. The label 132 is clearly visible through the pocket component 104.

Figure 8A:
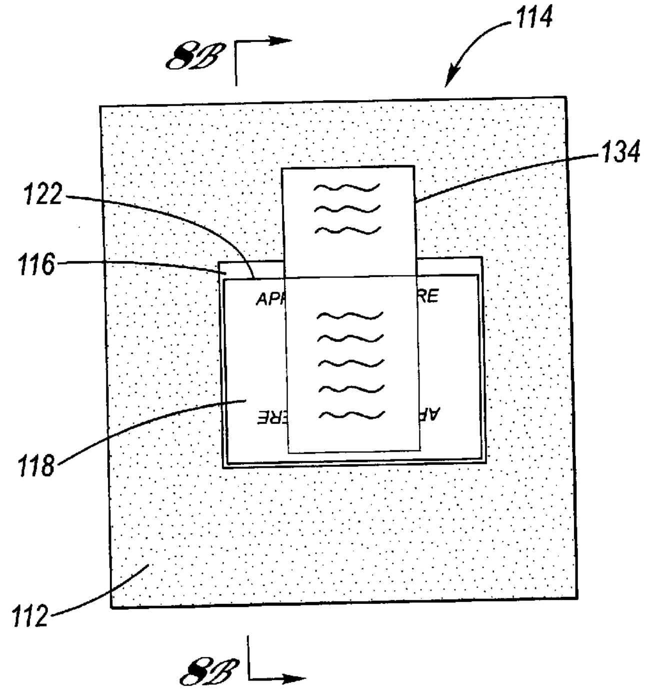
FIG. 8A is a plan view of the integrated pressure sensitive adhesive label application surface and pull card holder according to the present invention, seen at a second stage of operation.
Figure 8B:
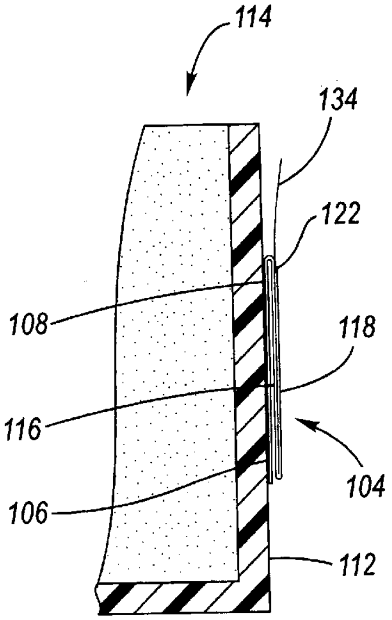
FIG. 8B is a side view, seen along line 8B of FIG. 8A.

Referring now to FIGS. 8A and 8B, operation of the pocket component will be detailed. When the container 114 reaches its destination, a pull card 134 is inserted into the mouth 122 of the pocket component 104, such that it is received between the front and rear walls 118, 116. Because the pocket component 104 is clear, the indicia on the pull card, as for example routing and/or instructions are clearly visible to the on looker.

Upon the current use of the container 114 concluding, the pull card is removed from the pocket component and the container is returned to the sender. The sender peels off the label 132, and applies a new one to the placard component consistent with a new use of the container. Easy re-labeling is achieved because the adhesive of the first side of the placard wall has a bonding strength that exceeds the adhesive bonding strength of the pressure sensitive adhesive of the labels being applied to the first side of the placard wall. Upon the container reaching its new destination, the receiver places a pull card in the pocket component consistent with the new use. The cycle of use may be repeated as often as desired.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An integrated pressure sensitive adhesive label application surface and pocket component comprising:

a placard component comprising a pliable plastic placard wall having a first side and an opposite second side, wherein a pressure sensitive adhesive is applied to said first side, and said second side comprises a pressure sensitive adhesive label application surface;

a pocket component comprising a pliable plastic rear wall and a pliable plastic front wall, said rear wall having a front side and an opposite rear side, said rear wall being connected to said placard wall at an imaginary demarcation therebetween, said front wall having a periphery, said front wall being disposed superposed said front side of said rear wall, said periphery being connected to said front side of said rear wall except adjacent the imaginary demarcation; and a fold over at the imaginary demarcation, wherein said rear side of said rear wall is selectively superposable said second side of said placard component by flexing of said fold over; and wherein said placard wall and said rear wall are integrally formed of a single sheet of pliable plastic.

2. The integrated pressure sensitive adhesive label application surface and pocket component of claim 1, wherein a label system sheet is adhesively applied to said second side of said placard wall; wherein said label system sheet comprises a pliable plastic sheet having an inner side and an opposite outer side, a pressure sensitive adhesive being applied to the inner side, and a release coating being applied to the outer side, wherein the adhesive adhesivley affixes the label system sheet to the second side of said placard wall.

3. The integrated pressure sensitive adhesive label application surface and pocket component of claim 1, further comprising a releasable fastener selectively holding said rear side of said rear wall superposed and adjacent said second side of said placard wall.

4. The integrated pressure sensitive adhesive label application surface and pocket component of claim 4, wherein said pocket component is composed of a substantially transparent pliable plastic.

5. The integrated pressure sensitive adhesive label application surface and pocket component of claim 4, wherein said second side of said placard wall has a release coating.

6. The integrated pressure sensitive adhesive label application surface and pocket component of claim 5, wherein said placard wall is opaque, and wherein selected indicia is imprinted on said placard wall indicative that a pressure sensitive adhesive label is intended for placement thereupon.

7. The integrated pressure sensitive adhesive label application surface and pocket component of claim 6, further comprising a releasable fastener selectively holding said rear side of said rear wall superposed and adjacent said second side of said placard wall.

8. A method for providing a placard component and a pocket component upon a container, comprising the steps of:

providing a container;

providing a single sheet of pliable plastic having a rear wall and a placard wall, said rear and placard walls being mutually connected at a fold over, said rear wall having a front side and an opposite rear side, said placard component having a first side and an opposite second side;

forming a pocket component at said rear wall, wherein a front wall having a periphery is connected to said front side of said rear wall at said periphery except adjacent the fold over, wherein the sheet is flexibly foldable at the fold over so that the rear side of the pocket component is selectively superposable said second side of said placard component;

applying an adhesive to said first side of said placard component; and adhesively connecting said first side of said placard component to the container.

9. The method of claim 8, further comprising the step of applying a release coating to the second side of the placard component.

10. The method of claim 8, further comprising the step of applying a label system adhesive sheet to the release coating at the second side of said placard component.

11. A method for placing indicia upon a container, comprsing the steps of:

providing a container;

providing a single sheet of pliable plastic having a rear wall and a placard wall, said rear and placard walls being mutually connected at a fold over, said rear wall having a front side and an opposite rear side, said placard component having a first side and an opposite second side;

forming a pocket component at said rear wall, wherein a front wall having a periphery is connected to said front side of said rear wall at said periphery except adjacent the fold over, wherein the sheet is flexibly foldable at the fold over so that the rear side of the pocket component is selectively superposable said second side of said placard component;

applying an adhesive to said first side of said placard component;

adhesively connecting said first side of said placard component to the container;

applying a first pressure sensitive adhesive label upon the second side of said placard component, said first pressure sensitive label having a first indicia thereon; and placing a pull card having second indicia thereon receivingly into the pocket component between the front and rear walls.

12. The method of claim 11, further comprising the steps of:

removing the first pressure sensitive adhesive label from the placard component;

removing the pull card from the pocket component;

applying a second pressure sensitive adhesive label upon the second side of said placard component; and placing a second pull card receivingly into the pocket component between the front and rear walls.

13. The method of claim 12, further comprising before the step of applying a first pressure sensitive adhesive label:

applying a release coating to the second side of the placard component.

* * * * *